(12) United States Patent
Berbereia

(10) Patent No.: US 9,943,021 B2
(45) Date of Patent: Apr. 17, 2018

(54) ROW DIGGER

(71) Applicant: Blake Berbereia, Tulare, CA (US)

(72) Inventor: Blake Berbereia, Tulare, CA (US)

(\*) Notice: Subject to any disclaimer, the term of this patent is extended or adjusted under 35 U.S.C. 154(b) by 0 days.

(21) Appl. No.: 15/245,485

(22) Filed: Aug. 24, 2016

(65) Prior Publication Data

US 2018/0054950 A1 Mar. 1, 2018

(51) Int. Cl.
*A01B 13/02* (2006.01)
*A01B 33/02* (2006.01)
*A01B 33/06* (2006.01)

(52) U.S. Cl.
CPC .......... *A01B 33/024* (2013.01); *A01B 13/025* (2013.01); *A01B 33/06* (2013.01)

(58) Field of Classification Search
CPC ..... A01B 13/025; A01B 69/024; A01B 39/14; A01B 33/025; A01B 5/00; A01B 5/16; A01B 7/00; A01B 33/06; A01B 33/106; A01C 5/062; A01C 5/064
USPC ......... 172/701, 181, 604, 49.5, 59, 110, 111, 172/169, 522
See application file for complete search history.

(56) References Cited

U.S. PATENT DOCUMENTS

| 661,307 A * | 11/1900 | Darby | A01B 33/065 172/49.5 |
| 2,429,298 A * | 10/1947 | Savage | A01B 33/06 172/51 |
| 2,619,017 A * | 11/1952 | Stephenson | A01B 9/00 172/111 |
| 3,130,794 A * | 4/1964 | Lovell | A01B 33/06 172/111 |
| 3,199,607 A * | 8/1965 | Granius | A01B 33/06 172/111 |
| 4,044,839 A * | 8/1977 | van der Lely | A01B 33/065 172/111 |
| 4,051,903 A * | 10/1977 | van der Lely | A01B 33/065 172/100 |
| 4,250,969 A * | 2/1981 | Orlanda | A01B 39/08 172/110 |
| 5,287,932 A * | 2/1994 | Fleck | A01B 39/166 172/111 |
| 5,944,115 A * | 8/1999 | Padgett | A01B 33/06 172/111 |

\* cited by examiner

*Primary Examiner* — Matthew D. Troutman
(74) *Attorney, Agent, or Firm* — Matthew C. McCartney; Eastman & McCartney LLP

(57) ABSTRACT

The Row Digger provides a tool that enables an operator of the Row Digger to remove dirt piles interfering with irrigation between crop field furrows and irrigation trenches. The Row Digger includes a frame capable of moving from a transportation position to an operation position. The Row Digger also includes a plurality of digger arms extending from a central hub and each terminating in a corresponding digging disc. The central hub is connected to the frame at a hub angle and is capable of rotation about a hub axis. Each digging disc is also connected to the corresponding digger arm at a disc angle. Each digging disc enters a crop furrow and utilizes the slopes of the ridges to create the rotation required about the hub axis and ensure a path of travel for the digging discs that removes the impeding dirt piles.

20 Claims, 13 Drawing Sheets

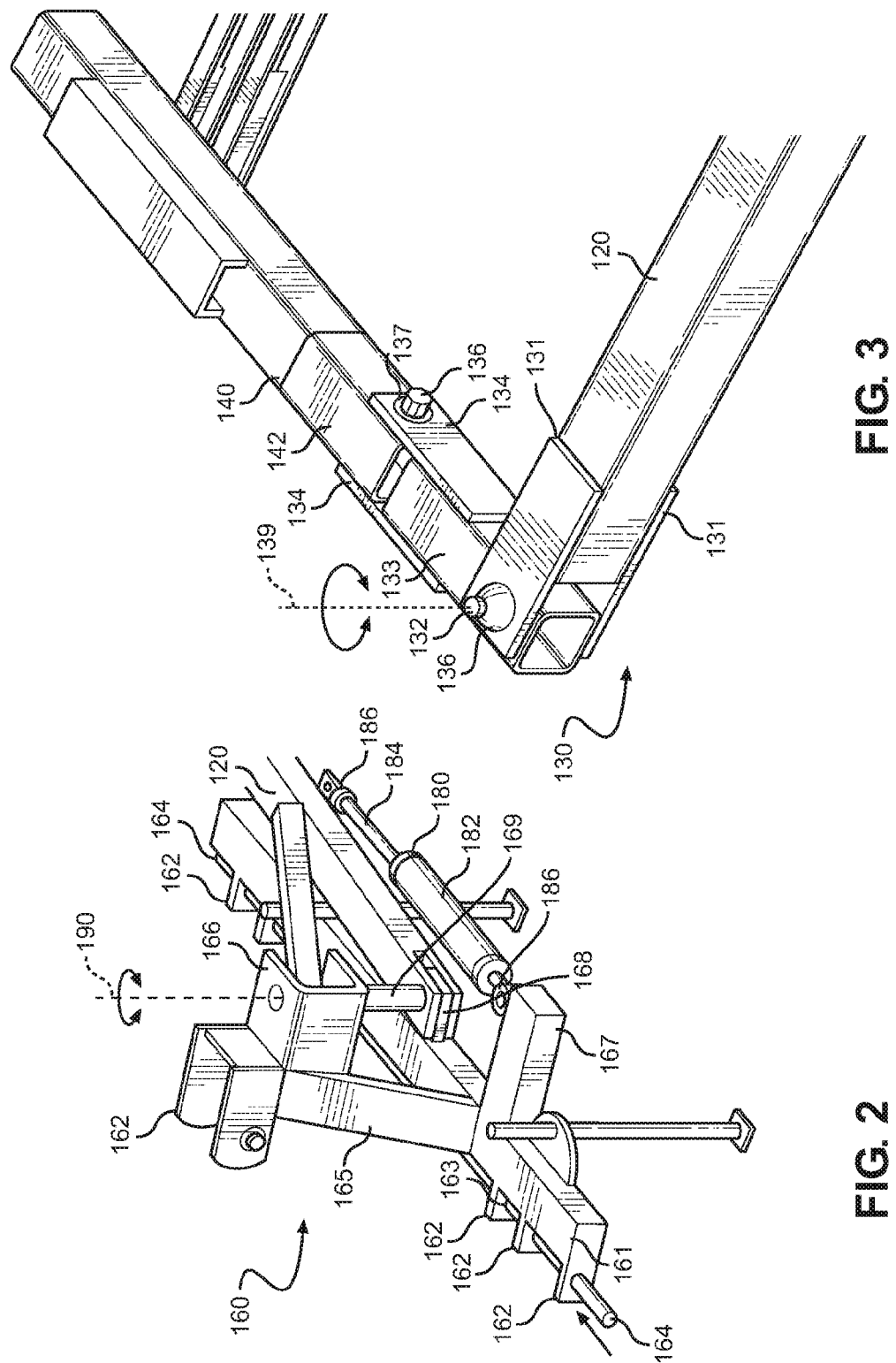

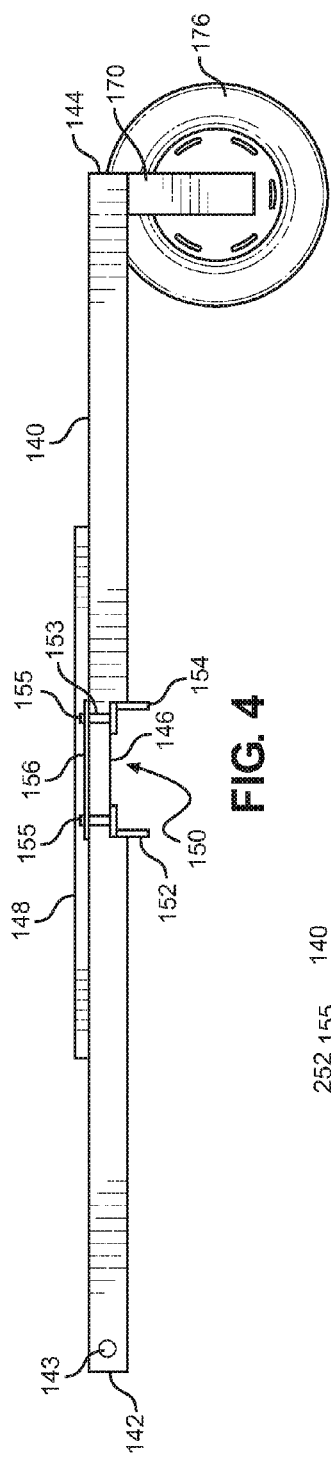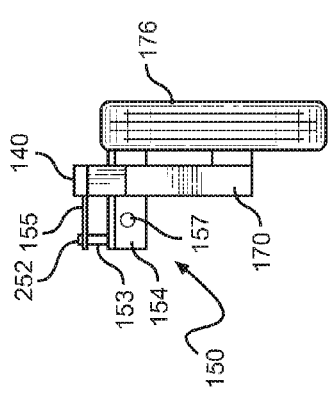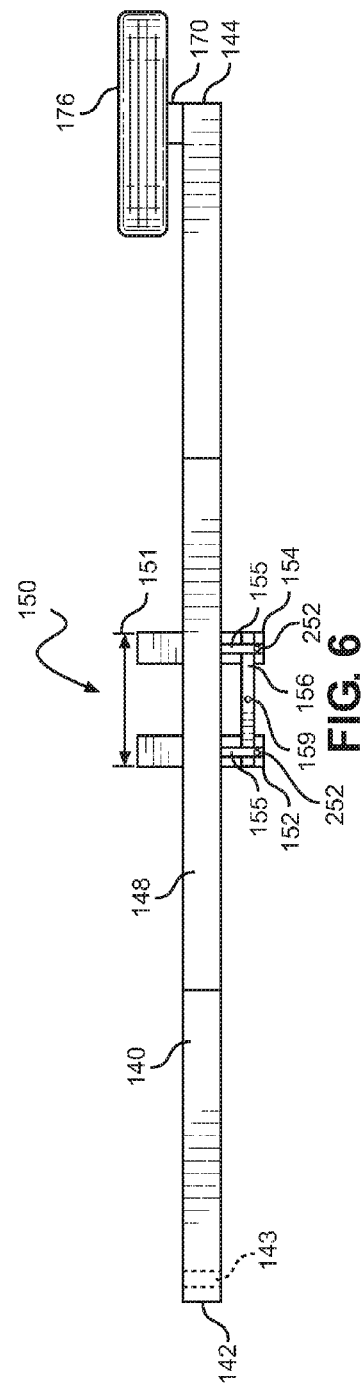

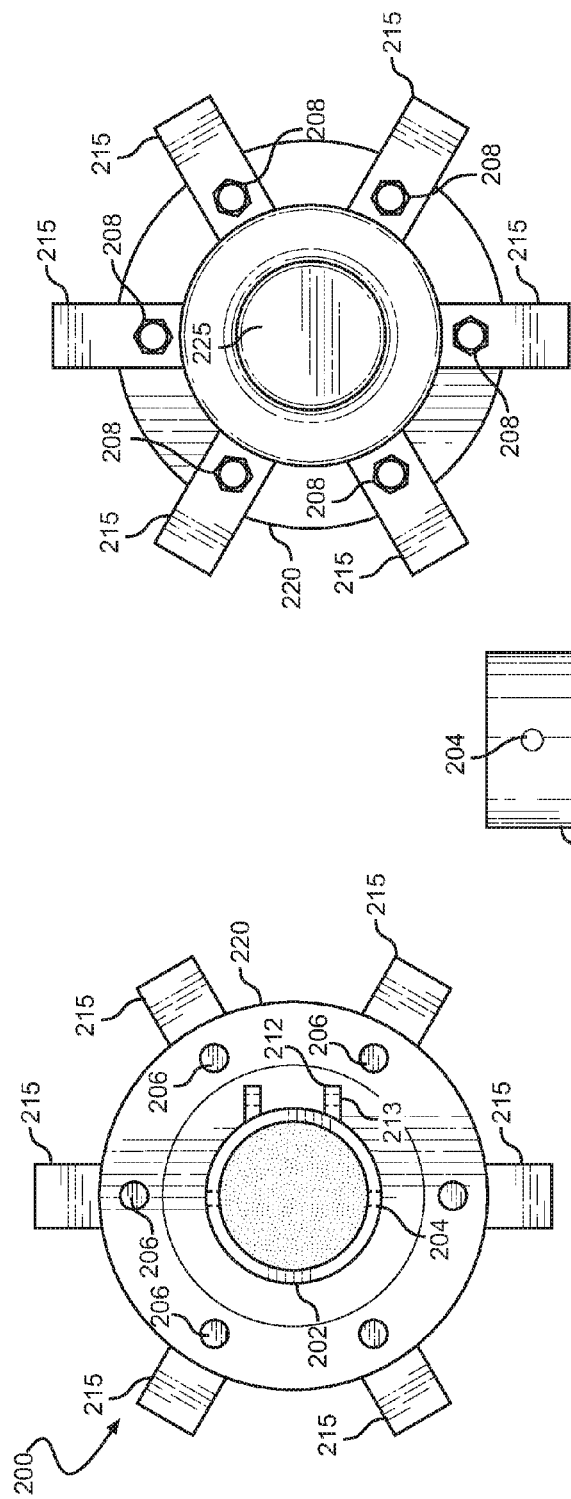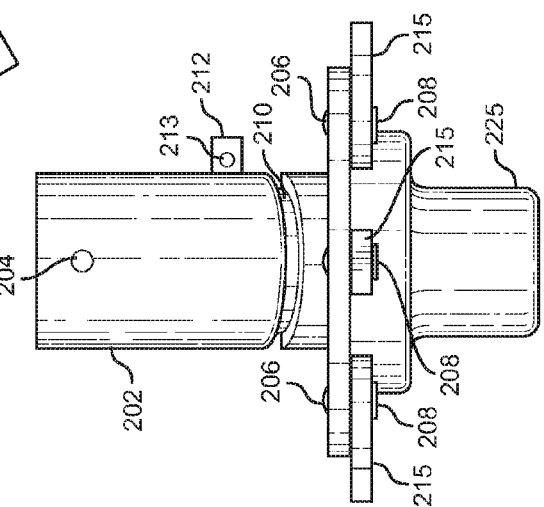

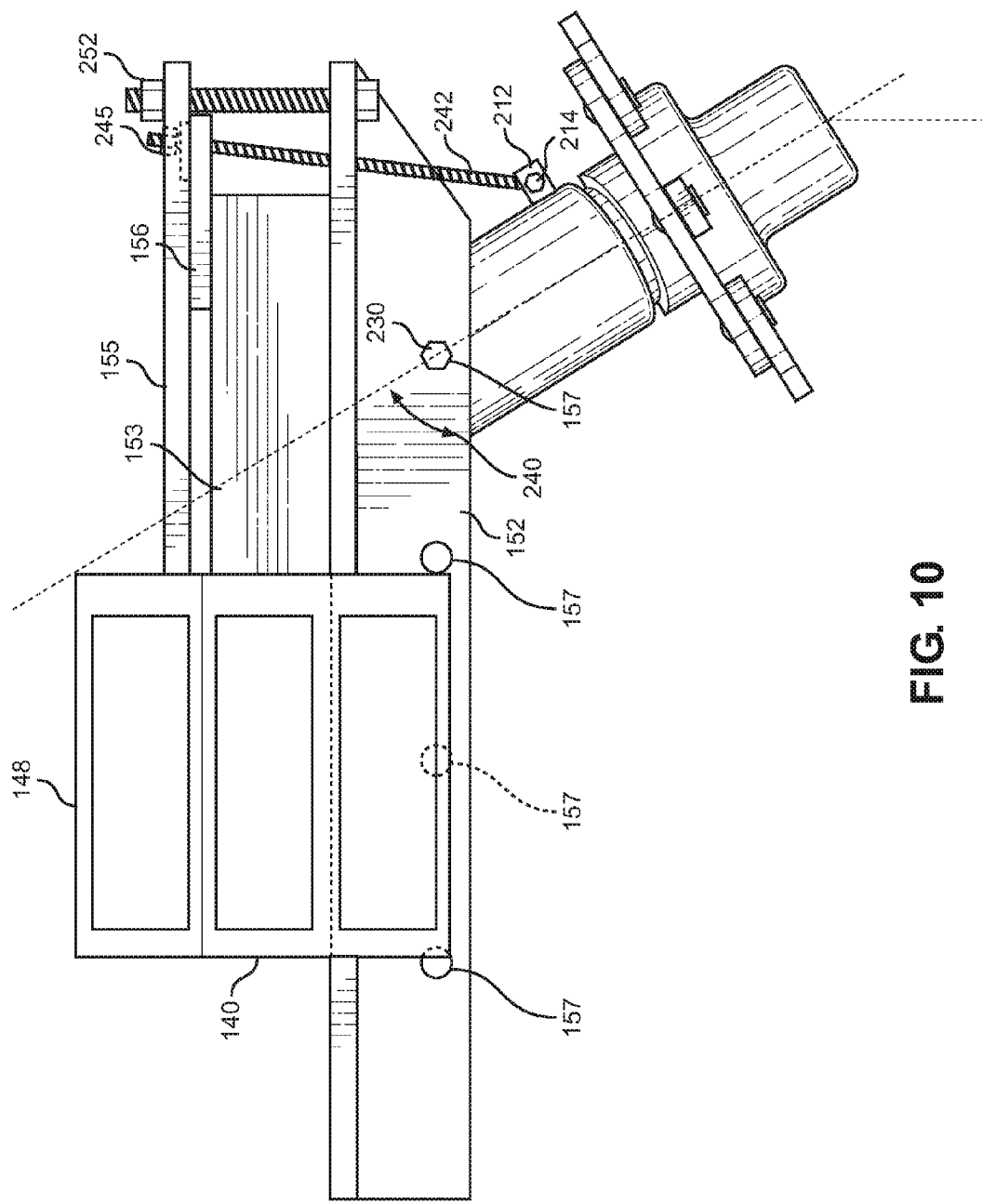

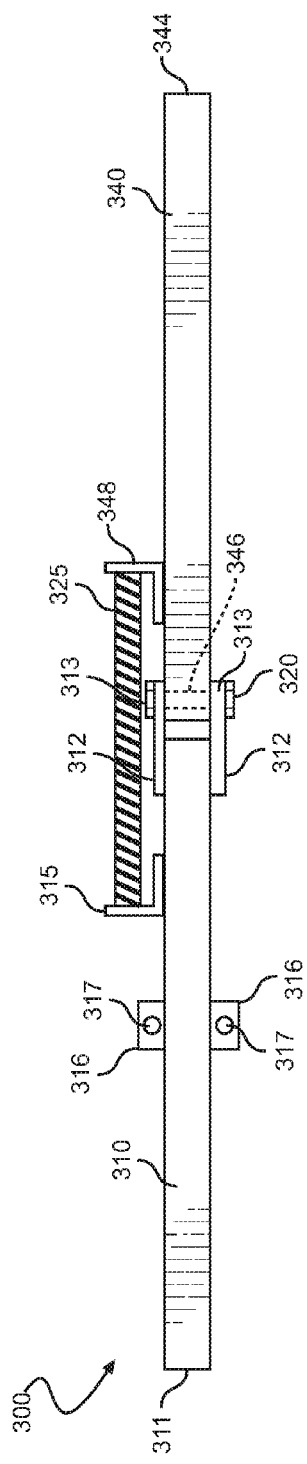
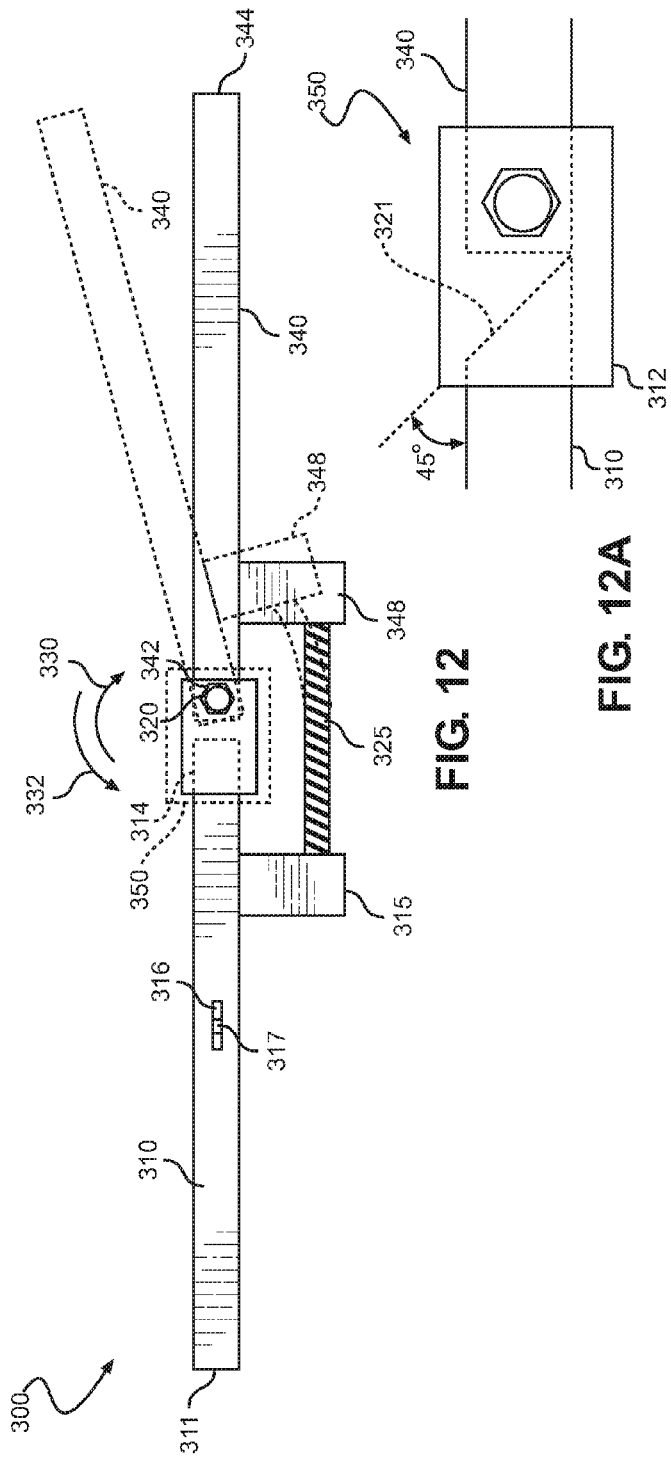
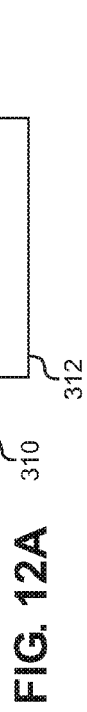
FIG. 11
FIG. 12
FIG. 12A

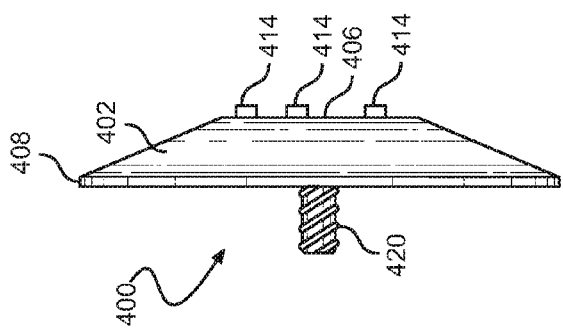
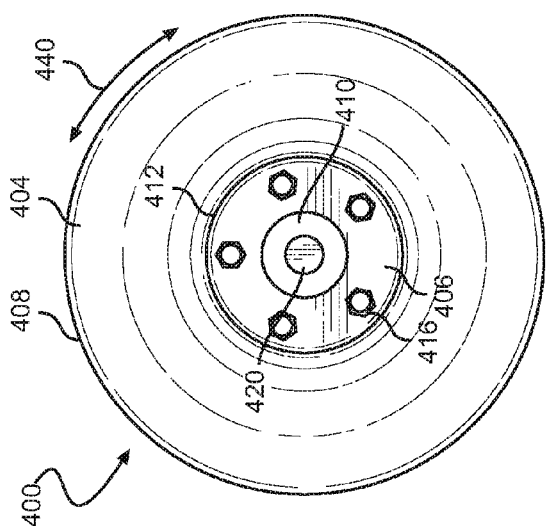
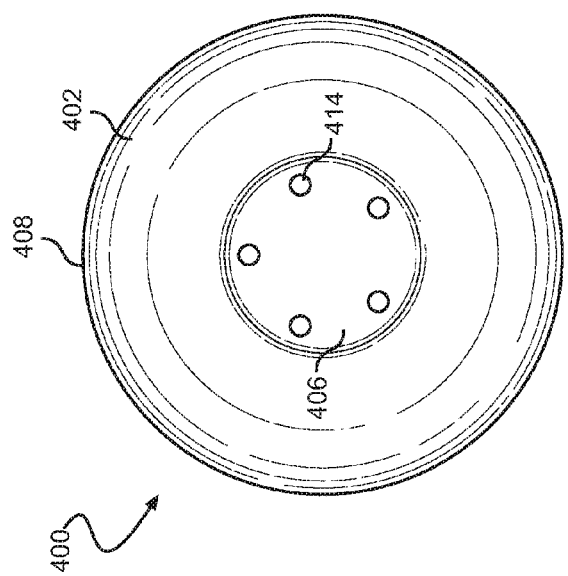
FIG. 16
FIG. 15
FIG. 14

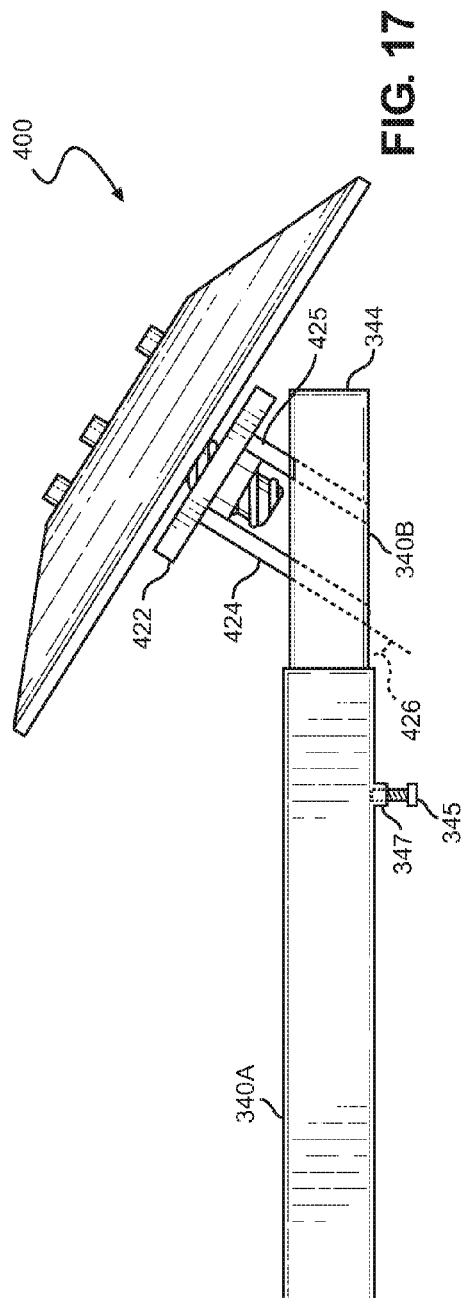
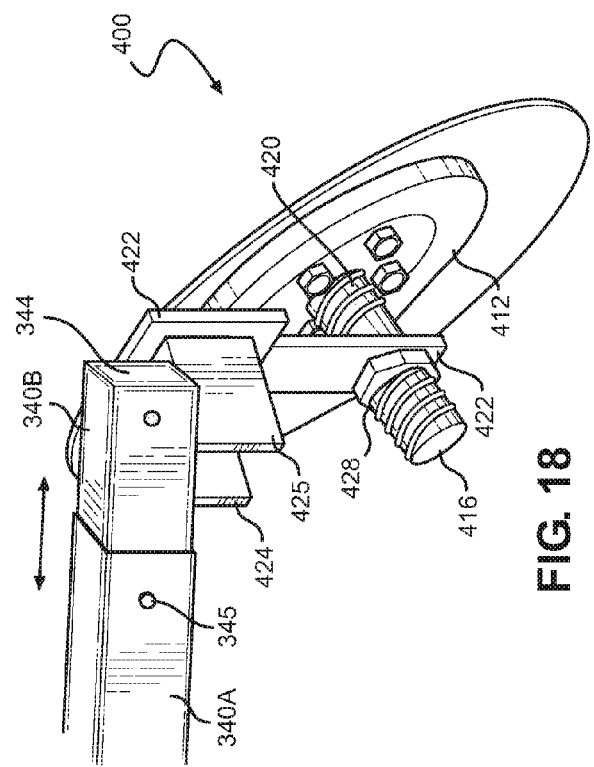
FIG. 17
FIG. 18

ROW DIGGER

FIELD OF INVENTION

The invention relates generally to cleaning farming tools and more particularly to a Row Digger used to dig out obstructions between field irrigation furrows and field irrigation trenches.

BACKGROUND OF THE INVENTION

Typical crops utilize a ridge and furrow design in fields in combination with furrow irrigation. Crops are grown in the ridge and water floods the furrows from the edges of the field. In typical configuration, water is placed in an irrigation trench spanning across one edge of the field. Water then passes from the irrigation trench along the furrows until the water reaches another irrigation trench on the opposite side of the field. The distance between furrows and the height of the top of the ridge and the bottom of the furrow is variable depending on soil conditions and crops to be grown.

The ridge and furrows are typically created using a plow drawn by a tractor. The process of making the ridge and furrows can often leave a small pile of dirt at the junction of a furrow edge and the irrigation trench. This small pile of dirt often acts as an impediment to the free flow of water from the irrigation trench to the furrow resulting in some furrows receiving more water than required and other furrows receiving less water than required or even no water at all. The conventional method of removing the small pile of dirt is manual labor with a shovel. This process is expensive, time consuming, and often is not completed properly resulting in increased labor costs and increased water costs due to less efficient irrigation.

In light of the above, it would be advantageous to have a tool that would enable a farmer to quickly and easily remove the small piles of dirt between the edges of the furrows and the irrigation trench. It would further be advantageous if the tool could be draw by a conventional tractor. It would further be advantageous if the tool did not have to be independently driven with hydraulics, pneumatics, or through electrical actuation in order to increase the reliability of the tool and lower both acquisition costs and operational costs. It would further be advantageous for the tool to be easily adjustable to accommodate the varying widths and heights of ridges and furrows between fields.

SUMMARY OF THE INVENTION

The Row Digger of the present invention provides a tool to quickly and easily remove the small piles of dirt that often accumulates between the intersecting edges of furrows and irrigation trenches. The Row Digger generally includes a frame, a hub assembly connected to the frame, a plurality of digger arms extending from the hub assembly and each digger arm terminating in a digging disc. The digger arms and digging discs connected thereto rotate about the hub assembly.

The Row Digger also has a wheel mounted to one end of the frame and a mechanism for connecting the frame to a tow vehicle, such as a tractor, on the opposite end of the frame.

In an embodiment of the invention, the frame is made up of a main frame, an extender frame, an elbow joint assembly, a hub frame, a hydraulic mount and a wheel frame.

The hydraulic mount has a mount frame with a mount frame top with an A-frame connecting the mount frame top to the mount frame. Extending away from the mount frame is a mount frame bottom. The mount frame has preferably two mounting brackets with through holes sized to mount to a tow vehicle. Similarly, the mount frame top has a mounting bracket with a through hole sized to mount to a tow vehicle. Tractor tow vehicles known in the art commonly have three point hydraulic mounting connectors (known in the art as a three-point hitch) and the mounting brackets are sized to fit such known hydraulic mounting connectors. When the mounting brackets of the mount frame bottom and mount frame top are connected to known three point hydraulic mounting connectors, an operator can use those hydraulic mounting connectors to move the hydraulic mount.

The extender frame is rotatably connected to the hydraulic mount by way of a mount frame rod extending from the extender frame to the mount frame top and by way of a hydraulic arm connected to the mount frame bottom and the extender frame. The hydraulic arm causes the extender frame to rotate about the mount frame rod from a transportation position to a use position. In the transportation position, the extender arm extends directly away from the mount frame. In the use position, the extender frame is rotated approximately 90 degrees such that the extender frame is substantially parallel to the mount frame and transverse to the tow vehicle.

The extender frame also has extender frame brackets with extender frame bracket through holes sized to receive a pin to enable the elbow joint assembly to be rotatably connected to the extender frame.

The elbow joint assembly includes an elbow frame with elbow frame brackets with corresponding elbow frame through holes to enable the elbow joint assembly to be pivotally connected to one end of the main frame. This pivotal connection allows the extender frame member to be raised in elevation with respect to the main frame when in a transportation position. The opposite end of the elbow frame has a through hole sized to receive a pin to enable the elbow frame also to be rotatably connected to the extender frame. The through holes on the elbow frame brackets are transverse to the through hole on the elbow frame.

When in a transportation position, the extender frame is rotated via the hydraulic mount such that the extender frame is aligned with the tow vehicle and substantially perpendicular to the hydraulic mount. The extender frame then rotates the elbow joint assembly such that the main frame is substantially aligned with the extender frame. In the transportation position the extender frame can also be raised by the hydraulic mount such that the end of the extender frame connected to the elbow joint assembly is higher in elevation than the main frame. As a result, the main frame pivots at the elbow frame brackets and pin. This configuration allows for a higher ground clearance when in the transportation position.

When in the use position, the extender frame is rotated via the hydraulic mount such that the extender frame is transverse to the tow vehicle and substantially parallel to the hydraulic mount. The extender frame then rotates the elbow joint assembly such that the main frame is substantially parallel to the tow vehicle and transverse to the extender frame. This enables the tow vehicle to orient the Row Digger along an irrigation trench when the tow vehicle travels alongside the irrigation trench.

A wheel frame is connected to the main frame opposite the elbow joint assembly. A wheel is connected to the wheel frame. When the Row Digger is connected to a tow vehicle, the tow vehicle tows the Row Digger about the wheel.

A hub frame is connected transversely to the main frame. The hub frame is sized to receive a hub assembly and secure the hub assembly at a hub angle. The hub frame is configured to allow the hub angle to be adjusted as well as the position of the hub assembly with respect to the hub frame. The adjustable features of the hub frame allow the row digger to be easily configured to accommodate fields with different dimensions of irrigation trenches, furrow spacing and row height.

The hub assembly has a hub housing and a hub flange wherein the hub flange can rotate 360 degrees with respect to the hub housing. A plurality of hub tabs extends from the hub flange and are sized to receive digger arms. The hub flange is connected to the hub housing via a bearing system to minimize friction when the hub flange rotates with respect to the hub housing. The hub tabs are equally spaced apart from one another around the circular perimeter surface of the hub flange.

Each hub flange has a digger arm connected to it. Each digger arm includes a hub arm rotatably connected to a disc arm. Each hub arm is connected to a corresponding hub tab on the hub flange. On the opposite end, the hub arm terminates in hub arm mounting brackets. The disc arm has a through hole and is rotatably mounted to the hub arm by way of a hub arm fastener. The hub arm has a hub arm spring bracket. Similarly, the disc arm has a disc arm spring bracket. An arm spring is disposed between and connected to the hub arm spring bracket and the disc arm spring bracket. When the disc arm is aligned with the hub arm, the arm spring is not energized. When the disc arm is rotated with respect to the hub arm, the arm spring is energized. The energized arm spring then puts a force on the disc arm to return it to an aligned position with the hub arm.

Each disc arm is connected to a digging disc. The digging disc has a front convex surface and a rear concave surface. The center of the digging disc has a flat central surface while the perimeter of the digging disc has a cutting perimeter surface. A spindle bearing system is connected to the flat central surface of the digging disc at a spindle plate. Extending from the spindle bearing system is a spindle shaft. The digging disc is capable of 360-degree rotation about the spindle shaft through the spindle bearing system. The spindle shaft is mounted to a disc mounting bracket which in turn is mounted to the disc arm. In an embodiment, the disc mounting bracket is mounted to the disc arm so as to create a disc angle between the digging disc and the disc arm. The disc angle ensures that the digging disc approaches a furrow in a field with the appropriate orientation so as to ensure that the convex surface comes into contact with the slope of a ridge in a field.

In use, the Row Digger is first connected to a tow vehicle, such as a tractor. If the Row Digger is used to remove dirt piles located between field furrows and the irrigation trench, the Row Digger is placed in the use position. If the Row Digger is merely to be transported, then the Row Digger is placed in the transportation position. The hub angle can be adjusted at the hub frame to ensure that the hub angle provides proper contact between a digging disc and a furrow. The Row Digger is then towed along an irrigation trench of a field with furrows between ridges. As the Row Digger is towed along an irrigation trench, the slopes of the ridges of the field will act against the convex front surface of a digging disc, causing the digging disc to exert a force on the digger arm which in turn causes the hub flange to rotate.

As the digging disc is pushed against the slope of a ridge in the field, the digging disc is rotated by the rotation of the hub flange and pressed on the surface of the furrow as a result of the hub angle. As the digging disc is pressed on the surface of the furrow, the digger arm bends at the junction of the hub arm and the disc arm and the arm spring is energized. As the hub flange continues its rotation within the hub assembly, the energized arm spring ensures that the digging disc remains in contact with the furrow until the junction of the furrow and the irrigation trench is reached and any dirt pile between the irrigation trench and furrow is excavated by the digging disc.

BRIEF DESCRIPTION OF THE FIGURES

The nature, objects, and advantages of the present invention will become more apparent to those skilled in the art after considering the following detailed description in connection with the accompanying drawings, in which like reference numerals designate like parts throughout, and wherein:

FIG. 2 is a close up perspective view of the hydraulic mount system which mounts the Row Digger to a tractor and allows for rotational movement of the extender frame with respect to the hydraulic mount frame;

FIG. 3 is a close up perspective view of the elbow joint assembly rotationally linking the extender frame to the main frame of the Row Digger;

FIG. 4 is a side view of the main frame and hub frame of the Row Digger and showing a tire frame with the tire connected to one end of the main frame;

FIG. 5 is a rear view of the main frame and hub frame of the Row Digger;

FIG. 6 is a top view of the main frame and hub frame of the Row Digger;

FIG. 7 is a top view of the hub assembly of the Row Digger and showing the hub angle tab;

FIG. 8 is a side view of the hub assembly of the Row Digger and showing the hub housing and hub housing through hole;

FIG. 9 is a bottom view of the hub assembly of the Row Digger and showing the hub housing base and hub housing flange with six equally spaced hub tabs mounted to the flange;

FIG. 10 is a close up cross-sectional view of the main frame of the Row Digger along the line 1-1 set forth in FIG. 1 with the tire frame and tire omitted from the view and showing the hub assembly mounted to the hub frame at a hub angle;

FIG. 11 is a top view of a digger arm of the Row Digger that includes a hub arm and a disc arm;

FIG. 12 is a side view of the digger arm of FIG. 11 and showing the hub arm connected to the disc arm at support brackets and showing in dashed lines the hub arm rotated about the arm bolt and extending the return spring;

FIG. 12A is an alternative point of connection between the hub and the disc arm utilizing an angled tip in the hub arm to limit the rotation of the disc arm with respect to the hub arm;

FIG. 14 is a front view of a digging disc of the Row Digger with a flat central surface and a curved outer surface;

FIG. 15 is a rear view of the digging disc of FIG. 14 and showing a disc hub mounted to the digging disc;

FIG. 16 is a side view of the digging disc of FIG. 15 and showing the through bolt threads that extend from the disc hub;

FIG. 17 is a top view of the end of a disc arm of the digger arm shown in FIGS. 11 through 12 and showing the digging disc connected to the digger arm by way of a through bolt of the disc hub mounted to a disc bracket which in turn is connected to the disc arm by way of disc arm angle brackets;

FIG. 18 is an isometric view of the end of disc arm and digging disc shown in FIG. 17 and showing the disc hub mounted to disc bracket such that the digging disc can rotate about the disc hub along the axis of the bolt of the disc hub;

DETAILED DESCRIPTION OF THE FIGURES

Figure 1:
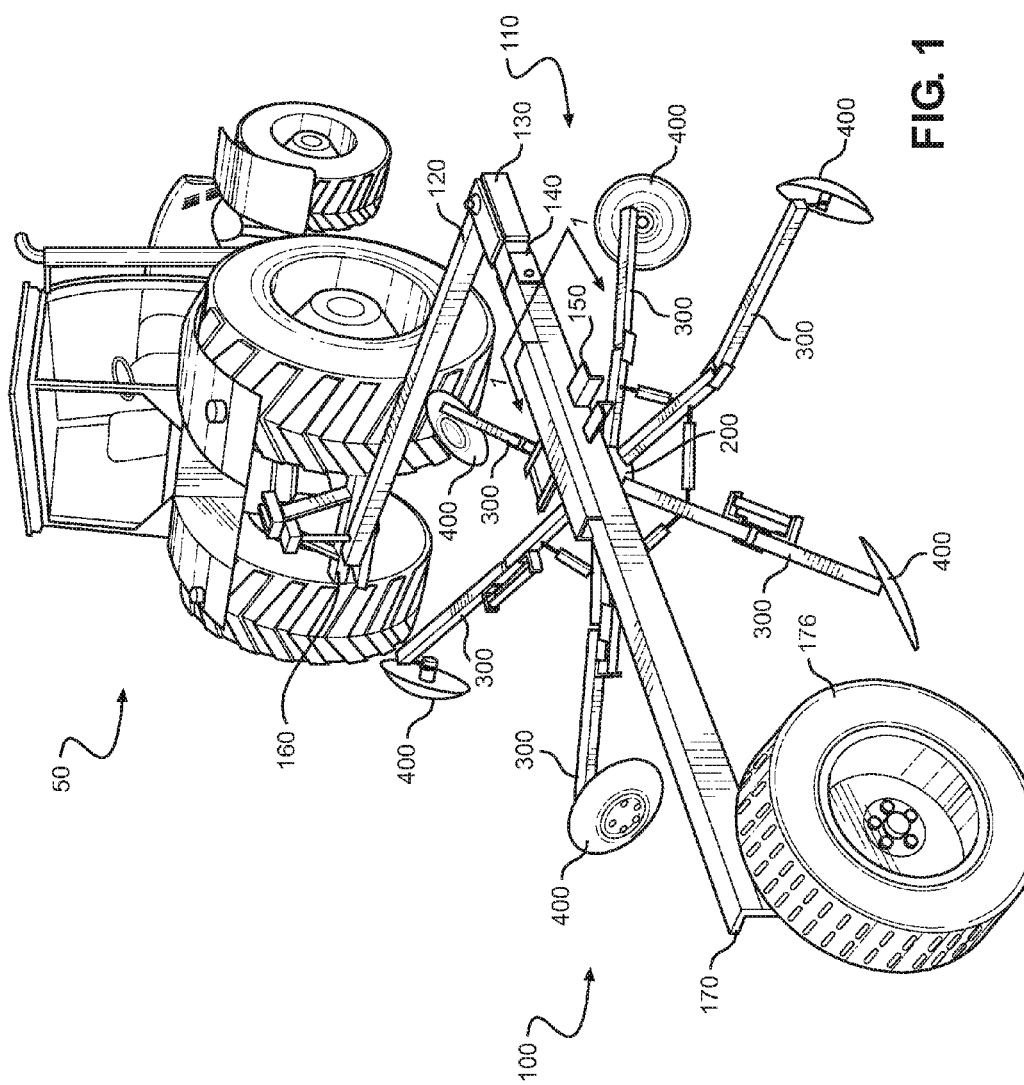
FIG. 1 is a rear perspective view of the Row Digger of the present invention connected to and towed by a tractor.

Referring initially to FIG. 1, the Row Digger of the present invention is shown and generally designated 100. The Row Digger 100 includes a frame 110, a hub assembly 200 connected to the frame 110 and capable of rotation with respect to the frame 110, and a plurality of digger arms 300 connected to the hub assembly 200 with each digger arm 300 terminating in a digging disc 400.

The frame 110 has an extender frame member 120 rotatably connected to the main frame member 140 at an elbow joint assembly 130. The extender frame member 120 is also connected to a hydraulic mount 160, which in turn is connected to a tractor 50. When in use, the hydraulic mount 160 rotates the extender frame member 120 such that the extender frame member 120 is substantially perpendicular to the main fame member 140.

A hub frame 150 is connected to the bottom of the main frame 140 approximately between the elbow joint assembly 130 and a wheel frame 170. A wheel 176 is connected to the wheel frame 170 to enable the Row Digger 100 to be towed by a vehicle, such as a tractor 50. In order to transport the Row Digger 100, the hydraulic mount 160 rotates the extender frame member 120 such that the extender frame member 120 and the main frame member 140 are substantially aligned with one another and the wheel 176 is located generally behind the tractor 50.

Referring next to FIG. 2, the hydraulic mount 160 is generally comprised of mount frame 161 with mounting brackets 162. The mounting brackets 162 are sized to receive conventional mounting tabs (not shown) located in the rear of tractor 50.

Each of the mounting brackets 162 has a through hole 163 to enable a fastener 164, such as bolt or pin, to secure the mounting brackets 162 of the hydraulic mount 160 to the tractor 50. The mount frame 161 also includes an A-frame 165 which includes an additional mounting bracket 162 for connection to a tractor 50. Extending from the A-frame 165 is mount frame top 166.

Extending from the side of mount frame 160 is hydraulic support member 167. Also extending from the side of mount frame 160 is mount frame bottom 168. Mount frame bottom 168 is located underneath mount frame top 166 such that a mount frame rod 169 is rotatably connected to and supported by mount frame bottom 168 and mount frame top 166. The mount frame rod 169 is connected to the end of extender frame member 120 opposite the elbow joint assembly 130 (generally shown in FIG. 1).

A hydraulic arm 180 having a cylindrical base 182 and an extendible rod 184 is connected to the hydraulic support member 167 and extender frame member 120 at hydraulic mounts 186. Hydraulic arm 180 is well known in the art and hydraulic hoses have been omitted from the figure. The hydraulic arm 180 rotates the extender frame member 120 about mount axis 190.

Referring next to FIG. 3, the elbow joint assembly 130 rotatably connects the extender frame member 120 to the main frame 140 of the Row Digger 100. The elbow joint assembly 130 has extender frame brackets 131 mounted to the end of the extender frame 120, opposite the end of the extender frame 120 with the mount frame rod 169 shown in FIG. 2. The extender frame brackets 131 have extender frame through holes 132 (not shown in Figure) that are sized to receive a pin 136.

An elbow frame 133 having elbow frame brackets 134 opposite and transverse to an elbow frame through hole 135 (not shown in Figure). The elbow frame 133 is connected to the extender frame brackets 131 through pin 136. Similarly, the elbow frame brackets 134 have elbow frame bracket through holes 137 that allow the elbow frame 133 to be connected to the elbow end 142 of the main frame 140 through use of a pin 136 through the elbow frame bracket through holes 137 and elbow end through holes 143 (not shown in Figure) through the elbow end 142 of the main frame 140.

Once the elbow joint assembly 130 is mounted to the extender frame 120 and the main frame 140, the main frame 140 can rotate with respect to the extender frame 120 about elbow axis 139. This rotation allows the main frame 140 to be aligned with the extender frame 120 when the Row Digger 100 is in a transportation mode. This rotation also allows the main frame 140 to be roughly perpendicular to the extender frame 120 when the Row Digger 100 is in use.

Referring next to FIGS. 4 through 6, the main frame 140 has an elbow end 142 and a wheel end 144 with a main frame aperture 146 located between the elbow end 142 and wheel end 144. A wheel frame 170 is mounted to the wheel end 144 of main frame 140. An elbow end through hole 143 is placed near the elbow end 142 to enable a pin 136 to mount the elbow joint assembly 130 to the main frame 140. A hub frame 150 is mounted within a main frame aperture 146 of the main frame 140. A main frame reinforcement panel 148 can be mounted to the top of main frame 140 in order to reinforce the main frame 140 above the main frame aperture 146.

Connected to the main frame 140 is a hub frame 150. The function of the hub frame 150 is to receive a hub assembly (as set forth in FIG. 10) at the appropriate location for particular field conditions. The hub frame 150 structure allows for quick and easy adjustments to be made to ensure that the row digger 100 properly and efficiently removes obstructions from field furrows as set forth more fully below.

Hub frame 150 has a first transverse frame member 152 and a second transverse frame member 154 that each traverse either side of the main frame 140 and are mounted within the main frame aperture 146 at a distance sufficient to accommodate a hub assembly 200 (as shown in FIGS. 7 through 9). It is to be appreciated by those skilled in the art that a main frame aperture 146 is not required and the hub frame 150 could simply be mounted to the bottom of the main frame 140. As can be more easily seen in FIG. 10, the first transverse frame member 152 and the second transverse frame member 154 each has a plurality of hub assembly through holes 157 to enable a hub assembly 200 to be connected to the hub frame 150 at various locations along the length of the first transverse frame member 152 and the second transverse frame member 154. The plurality of hub assembly through holes 157 allow for adjusting the point of connection of the hub assembly 200 to the hub frame 150 to accommodate different field geometries.

Horizontal spacers 153 extend from the top of the first transverse frame member 152 and from the top of the second transverse frame member 154. A hub linkage frame member 156 is slidably connected to the horizontal spacers 153 such that the hub linkage frame member 156 is parallel to the main frame 140. The hub frame 150 also has hub linkage supports 155 extending from the side of the main frame 140 and slidably connected to the top of the hub linkage frame member 156.

The hub linkage supports 155 and the horizontal spacers 153 allow for the slidable adjustment of the hub linkage frame member 156 towards and away from the main frame 140. This slidable adjustment allows a user to adjust the location of the hub assembly 200 with respect to the hub frame 150. This adjustability ensures that the row digger 100 can be adjusted to meet differing dimensions of field irrigation trenches. More specifically, when the hub assembly 200 is mounted to the hub frame 150 at hub assembly through holes 157 closer to the mainframe, the adjustability of the hub linkage frame member 156 allows the hub linkage 155 to similarly move closer to the main frame 140. Such adjustability is necessary in order to ensure that the hub assembly 200 can be set at the appropriate hub angle 240 (shown in FIG. 10) through use of the hub linkage frame member 156.

To make the desired adjustment, fasteners 252 (shown in FIG. 10) are loosened sufficiently to enable the hub linkage frame member 156 to slide with respect to the hub linkage supports 155 and the horizontal spaces 153. Once the hub linkage frame member 156 is appropriately positioned, fasteners 252 are re-tightened to secure hub linkage frame member 156 between hub linkage supports 155 and horizontal spacers 153.

The hub linkage frame member 156 has a hub assembly angle aperture 159 to enable a hub assembly 200 to be held at a hub angle 240 with respect to the hub frame 150 as set forth more fully in connection with in FIG. 10 below.

Referring next to FIGS. 7 through 9, the hub assembly 200 has a hub housing 202 rotatably connected to a hub flange 220 by way of a bearing system 210 such that the hub flange 220 can rotate with respect to the hub housing 202. The hub housing has a hub housing through hole 204 for use in mounting the hub assembly to the hub frame 150. The hub housing 202 also has hub angle tabs 212 with hub angle tab through holes 213.

A plurality of hub tabs 215 are connected to the hub flange 220 by way of threaded studs 206 and nuts 208. In a preferred embodiment, six hub tabs 215 are spaced equally apart on the hub flange 220. The hub flange 220 is connected to a hub flange housing 225 in order to accommodate sufficient interior space for the bearing system 210.

Referring next to FIG. 10, the hub assembly 200 is shown connected to the hub frame 150 by way of a hub housing bolt 230 through one of the plurality of hub assembly through holes 157 of the first transverse frame member 152 and second transverse frame member 154 (shown in FIGS. 4-6) such that the hub assembly 200 is capable of rotation about the hub housing bolt 230. As noted above, the hub assembly 200 can be attached to the hub frame 150 at any of the plurality of hub assembly through holes 157 in order to ensure that the hub assembly 200 is spaced with respect to the main frame 140 appropriately for the field conditions.

A hub angle bolt 242 is connected to the hub angle tab 212 by way of a hub angle fastener 214. The opposite end of hub angle bolt 242 is passed through hub assembly angle aperture 159 of the hub linkage frame member 156 and is then secured to the hub linkage frame member 156 by hub angle nut 245. Turning the hub angle nut 245 adjusts the hub angle 240. As set forth more fully below, the hub angle 240 ensures that the row digger 100 properly contacts the surface of a field and excavates as intended.

Referring next to FIGS. 11 through 12, a digger arm 300 is shown with a hub arm 310 rotatably connected to a disc arm 340 by way of hub arm mounting brackets 312. The hub arm 310 has a hub end 311 and a second end 314. The hub arm mounting brackets 312 are mounted on either side of the second end 314, and each have a hub arm mounting bracket through hole 313. Between the hub end 311 and the second end 314 are lateral support tabs 316 that extend from the sides of the hub arm 310. Each lateral support tab 316 has a lateral support through hole 317.

The disc arm 340 has a first end 342 and a second end 344. Near the first end 342 is a disc arm mounting hole 346. The disc arm mounting hole 346 is aligned with the mounting bracket through hole 313 on each hub arm mounting bracket 312 to enable an arm fastener 320 to secure the disc arm 340 to the hub arm 310 such that the disc arm 340 can rotate about the arm fastener 320.

The hub arm 310 also has a hub arm spring bracket 315 that is connected to the side of the hub arm 310. Similarly, the disc arm 340 has a disc arm spring bracket 348 that is connected to the side of the disc arm 340. An arm spring 325 is connected between the hub arm spring bracket 315 and the disc arm spring bracket 348. Arm spring 325 provides a rotational force in rotation direction 330 about the arm fastener 320. Thus, to the extent that disc arm 340 is rotated in rotation direction 332, the arm spring 325 creates an opposite rotational force in rotation direction 330 to return the disc arm 340 to an aligned position with the hub arm 310. The arm spring 325 also prohibits rotation in direction 330 past the aligned position with the hub arm 310. FIG. 12 shows the disc arm 340 in the aligned position and shows the disc arm 340 in dashed lines out of the aligned position after rotation in rotation direction 332.

FIG. 12A is an alternative embodiment of the point of connection 350 between the hub arm 310 and the disc arm 340. In this alternative embodiment, hub arm 310 terminates in an angled tip 321 between hub arm mounting brackets 312. The angled tip 321 is at approximately a 45-degree angle with respect to the hub arm 310. The disc arm 340 is rotatably mounted to mounting brackets 312 and is adjacently located next to the angled tip 321 of the hub arm 310. This configuration enables the angled tip 321 to limit rotation of the disc arm with respect to the hub arm to no more than approximately 45 degrees in rotation direction 332.

Figure 13:
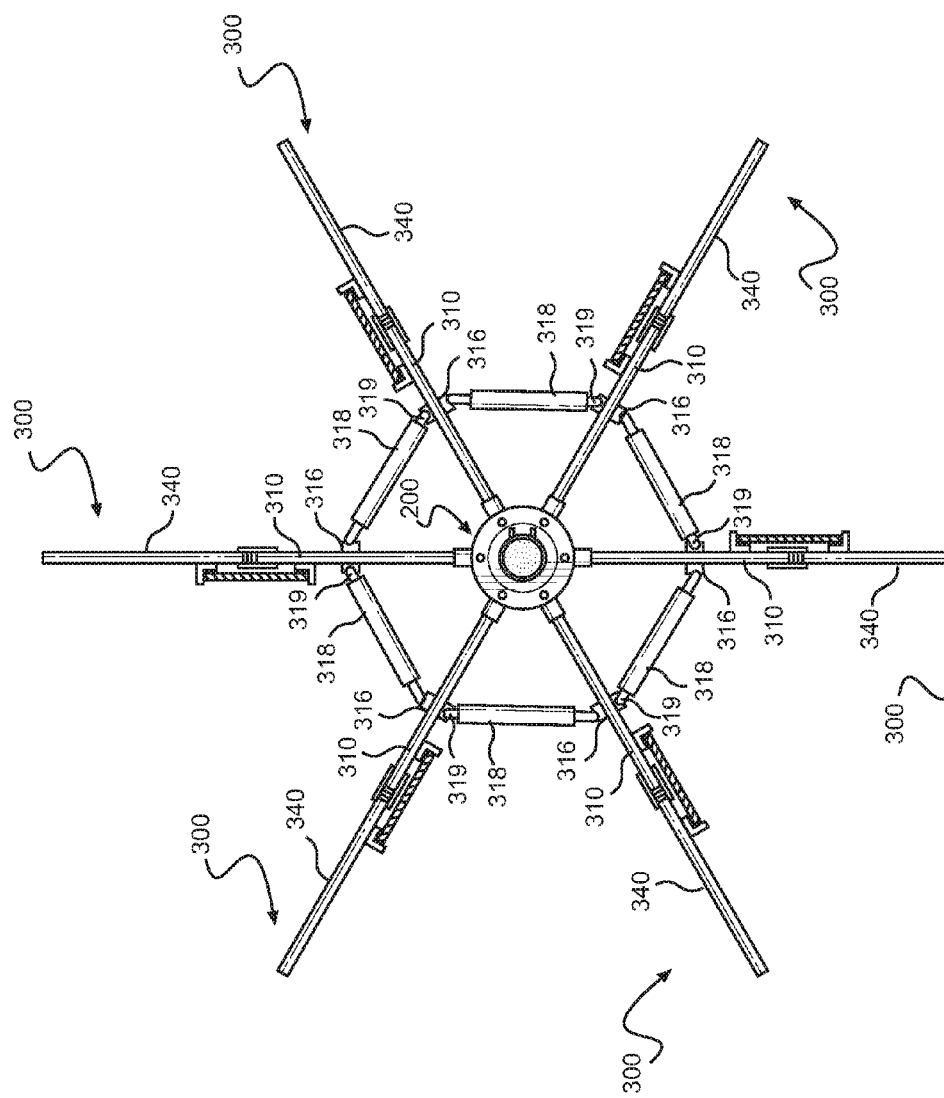
FIG. 13 is a top view of six digger arms mounted to the six respective hub tabs of the hub assembly show in FIGS. 7 through 9 and showing lateral supports connected between the respective digger arms.

FIG. 13 shows six digger arms 300 with the hub end 311 of each hub arm 310 connected to a corresponding hub tab 215 of a hub assembly 200. Lateral support turn-buckles 318 are connected at either end to a lateral support tab 316 on a hub arm 310 such that one lateral support turn buckle 318 connects one hub arm 310 to an adjacent hub arm 310. Each hub arm 310 is connected to at least two lateral support turn-buckles 318. The lateral support turn buckles 318 are connected to the lateral support tabs 316 by way of turn buckle bolts 319 through corresponding lateral support through holes 317 of the lateral support tabs 316.

Referring next to FIGS. 14 through 16, a digging disc 400 is shown with a front convex surface 402 and a rear concave surface 404. The front convex surface 402 and rear concave surface each terminate in the center with a flat central surface 406 and terminate at the outer edge in a cutting perimeter surface 408. A spindle bearing system 410 is connected to a spindle plate 412. The spindle plate 412 is connected to the flat central surface 406 of the rear concave surface by way of spindle lugs 414 passed through the flat central surface 406 of the front convex surface 402 through the spindle plate 412 and spindle lug nuts 416 which ensure the spindle plate 412 is tightly secured on the flat central surface 406. A spindle shaft 420 extends from and is centered on the spindle bearing system 410. The digging disc 400 rotates about the spindle shaft 420 at the spindle bearing system 410.

Referring next to FIGS. 17 and 18, the digging disc 400 is shown connected to the second end 344 of the disc arm 340. The spindle shaft 420 of the digging disc 400 is passed through a disc mounting bracket 422 and secured with a disc nut 428. Extending from the disc mounting bracket 422 are first angled tab 424 and second angled tab 425. First angled tab 424 and second angled tab 425 are each at a disc angle 426 with respect to the disc mounting bracket 422. The second end 344 of the disc arm 340 is connected to the first angled tab 424 and second angled tab 425 of the disc mounting bracket 422.

The disc arm 340 shown in FIGS. 17 and 18 has a disc arm receiver portion 340A and a disc arm telescoping portion 340B that enables the disc arm 340 to be slidably adjustable by way of sliding the disc arm telescoping portion 340B within the disc arm receiver portion 340A. This adjustability enables a user to adjust the disc arm 340 to accommodate different row spacing in fields. Once the disc arm 340 has been properly adjusted, a set screw 345 can be inserted in a set screw threaded collar 347 located in the disc arm receiver portion 340A. The set screw 345 applies pressure to the disc arm telescoping portion 340B to ensure that the disc arm 340 remains properly adjusted.

Figure 19:
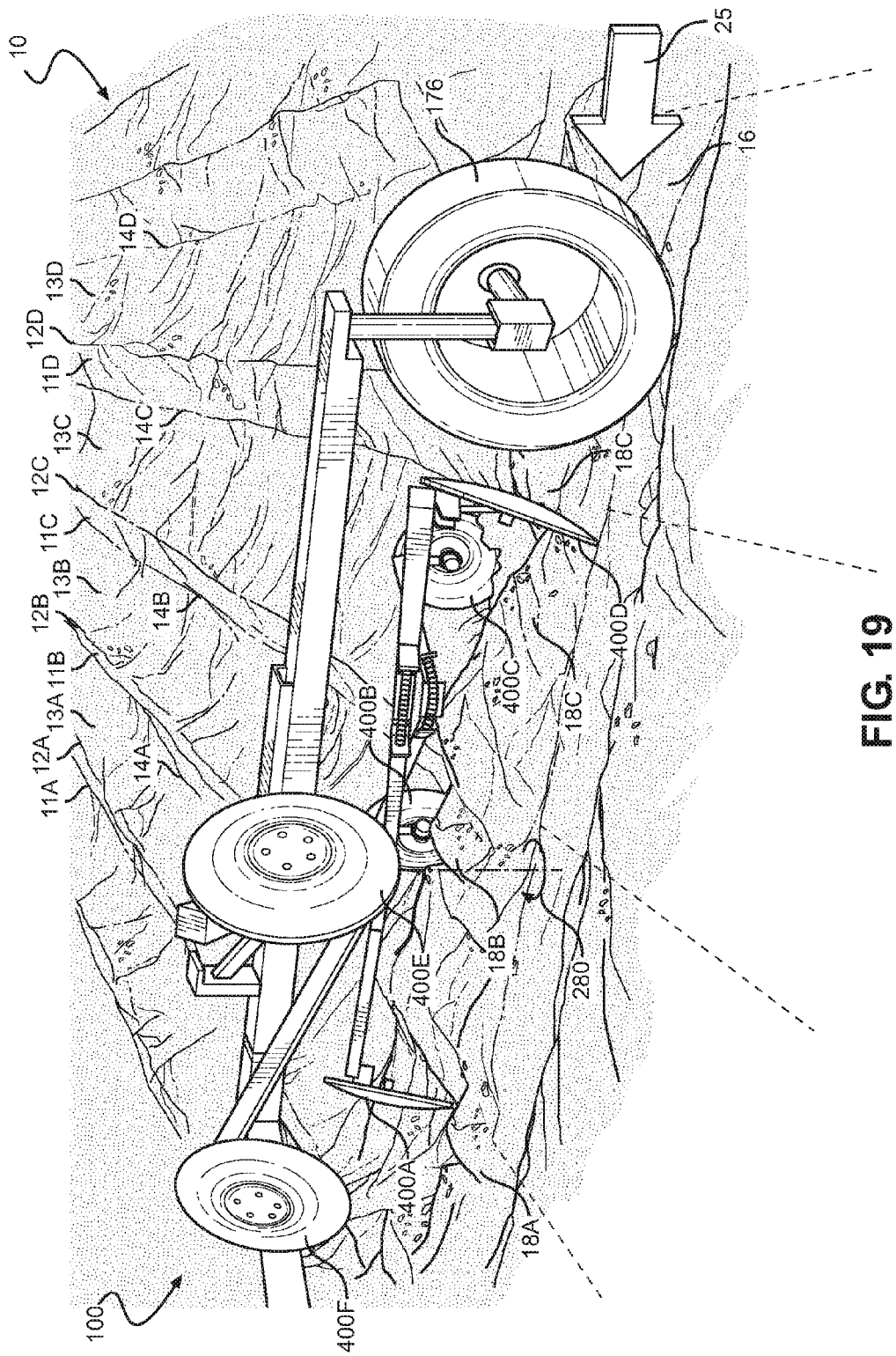
FIG. 19 is an isometric view of the Row Digger oriented in a ridge and furrow field with an irrigation trench and showing the wheel of the Row Digger placed in the irrigation trench and three of the six digging discs are near the field and on one side of the main frame and the remaining three digging discs are on the other side of the main frame away from the field with the discs on the field lower than the discs away from the field as a result of the hub angle.
Figure 20:
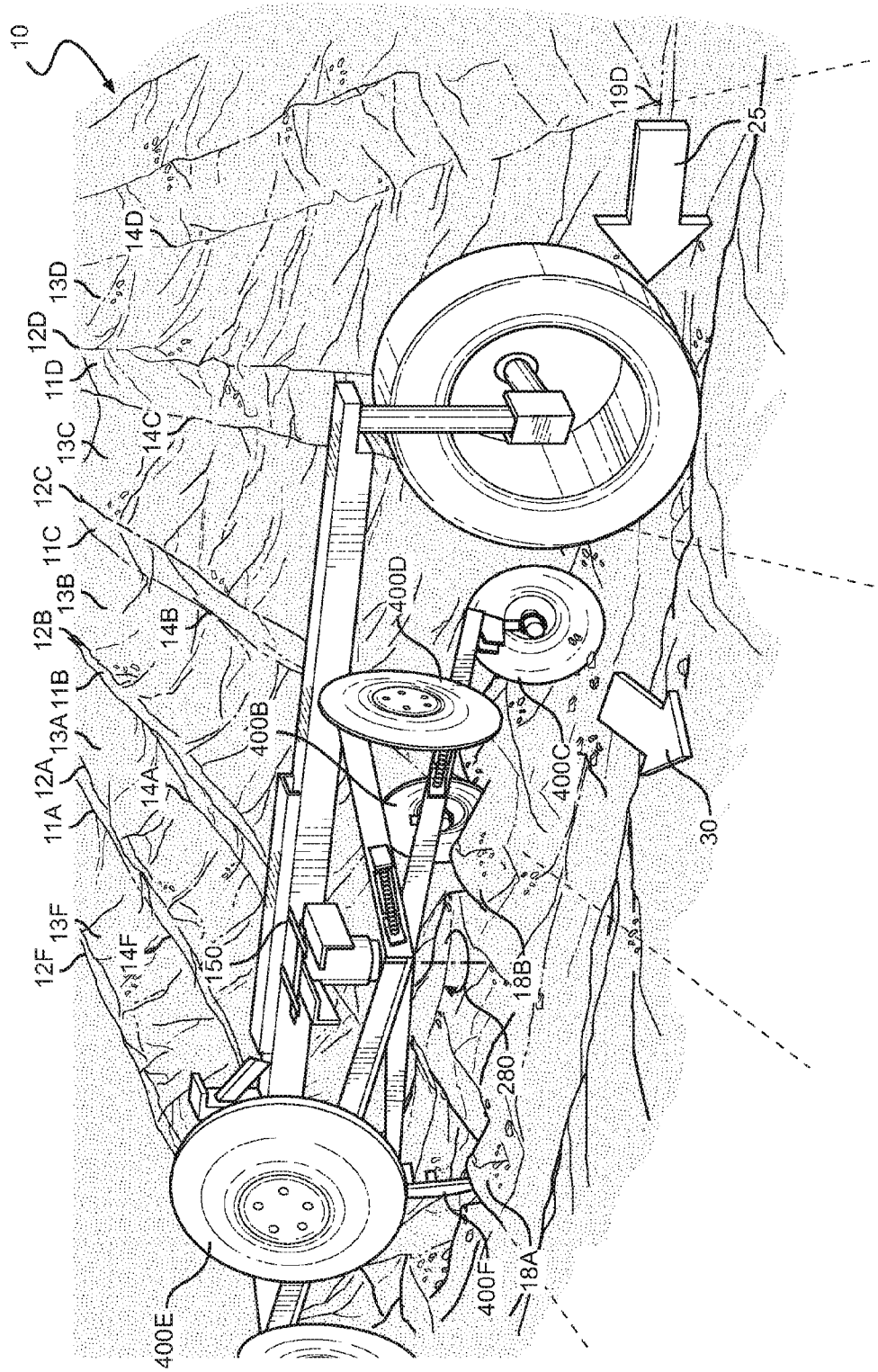
FIG. 20 is an isometric view of the Row Digger show in FIG. 19 and having been advanced along the irrigation trench by a tractor from the position shown in FIG. 19 showing the movement of each of the digging discs with respect to the field and the removal of a dirt pile between the irrigation trench and furrow by a digging disc.
Figure 21:
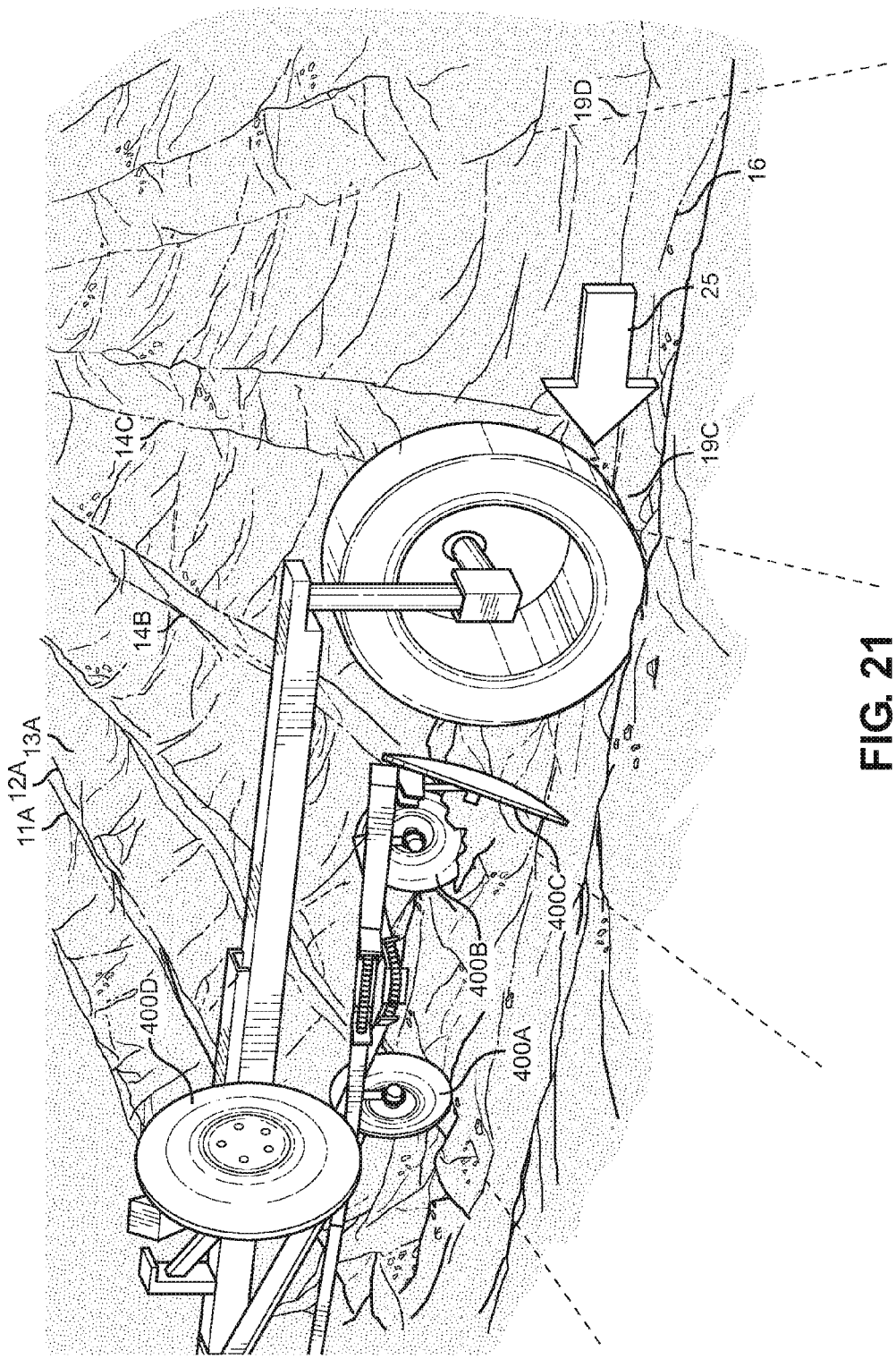
FIG. 21 is an isometric view of the Row Digger show in FIG. 20 and having been advanced along the irrigation trench by a tractor from the position shown in FIG. 20 and further tracking the movement of the six digging discs and their respective digger arms and further showing a clear passage between a field furrow and the irrigation trench after successful removal of a dirt pile by the Row Digger.

FIGS. 19 through 21 show the Row Digger 100 in use in a field 10. Referring to FIG. 19, the field 10 is shown with ridges 12A, 12B, 12C and 12D. Each ridge 12A, 12B, 12C and 12D is located at the top of a left slope 11A, 11B, 11C, 11D and a right slope 13A, 13B, 13C, 13D respectively. Furrow 14A is formed between right slope 13A of ridge 12A and left slope 11B of ridge 12B, ridge furrow 14B is formed between right slope 13B of ridge 12B and left slope 11C of ridge 12C, and ridge furrow 14C is formed between right slope 13C of ridge 12C and left slope 11D of ridge 12D. The ridges 12A, 12B, 12C, and 12D terminate at and above irrigation trench 16. However, furrows 14A, 14B and 14C are shown with respective dirt piles 18A, 18B, and 18C located between the furrows 14A, 14B and 14C and the irrigation trench 16. The dirt piles 18A, 18B, and 18C are required to be removed in order to allow irrigation water to pass from the irrigation trench 16 to furrows 14A, 14B, and 14C. It is the function of the digging discs 400 of Row Digger 100 to remove the dirt piles 18A, 18B, and 18C. FIGS. 19 through 21 sequentially show how the Row Digger 100 removes dirt piles 18.

The Row Digger 100 is shown in FIG. 19 with digging discs 400A, 400B, 400C, 400D, 400E and 400F each at a different orientation with respect to the field 10.

In FIG. 19, digging disc 400A is shown suspended above furrow 14A. Digging disc 400A is shown entering furrow 14A with the front convex surface 402 parallel to the ridge 12A. The disc angle 426 of the digging disc 400A to the disc arm 340 ensures that the digging discs 400 enter the furrows 14 at the orientation of the front convex surface 402 parallel to the ridges 12.

In FIG. 19, digging disc 400B is shown moving from the right slope 13B of ridge 12B to the left slope 11C of ridge 12C. As a result of the hub angle 240 of the hub assembly 200, digging disc 400B is shown in FIG. 19 lower than digging disc 400A such that the digging disc 400B is in contact with the surface of furrow 14B.

In FIG. 19, digging disc 400C is shown in contact with furrow 14C. As a result of the hub angle 240 of the hub assembly 200, digging disc 400C is shown compressed into the surface of furrow 14C such that the disc arm 340 has rotated with respect to the hub arm 310 about the hub arm fastener 320 and energized the arm spring 325. As a result of the disc angle 426 and the 360-degree rotation of the digger arms 300 about the hub assembly 200, the digging disc 400C is oriented such that rear convex surface 404 of the digging disc 400C faces dirt pile 18C and is parallel to the irrigation trench 16.

In FIG. 19, digging discs 400D, 400E and 400F are each on the opposite side of the frame 110 as digging discs 400A, 400B and 400C. Digging discs 400D, 400E, and 400F are all higher than digging discs 400A, 400B and 400C as a result of the hub angle 240 of the hub assembly 200.

The Row Digger 100 is show in FIG. 19 moving in direction 25 with wheel 176 located in and traveling along irrigation trench 16. Any vehicle known in the art, such as a tractor 50 (not shown) can be used to provide the requisite power needed to tow the Row Digger 100 in direction 25. However, it is the slopes 11 and 13 between the ridges 12 that provides the rotational force required to rotate the digger arms 300 and connected digging discs 400 about the hub assembly 200.

Turning to FIG. 20, the Row Digger 100 is shown advanced further in direction 25 as compared to FIG. 19 with the digger arms 300 also shown having rotated in direction 280 about the hub assembly 200.

In FIG. 20, digging disc 400A is omitted from view, but is in contact with the right slope 13A of ridge 12A. As the Row Digger 100 continues to be advanced in direction 25, the right slope 13A will push against the front convex surface 402 of digging disc 400A causing the digging disc 400A to rotate digger arms 300 in rotation direction 280 about the hub assembly 200.

In FIG. 20, digging disc 400B is shown in contact with furrow 14B with its concave rear surface 404 now parallel to the irrigation trench 16 and facing dirt pile 18B. As the digger arms 300 continue to rotate, the disc arm 340 will begin to rotate with respect to the hub arm 310 such that the arm spring 325 will become energized.

In FIG. 20, digging disc 400C is shown exiting furrow 14C. Once the arm spring 325 is fully energized, the digger arm 300 connected to digging disc 400C begins to move in an upward direction because of the hub angle 240. However, as the digging disc 400C begins to move in the upward direction, the energized arm spring 325 begins to release its energy pulling the disc arm 340 back towards its straight position with the hub arm 310. This movement ensures that the digging disc 400C stay in contact with the furrow 14C as the digger arms 300 continue to rotate about the hub assembly 200 and facilitates the excavation of the dirt pile 18C. The rear concave surface 404 of the digging disc 400C excavates dirt pile 18C as the digging disc 400C passes from the furrow 14C to the irrigation trench 16. The excavated dirt pile 18C is pushed by the digging disc 400C in direction 30 until the excavated dirt pile 18C is no longer impeding the flow of irrigation water from irrigation trench 16 to furrow 14C. As the digging disc 400C passed from the furrow 14C to the irrigation trench 16 it crosses underneath the main frame 140 of the Row Digger 100.

In FIG. 20, digging disc 400D and digging disc 400E each remain on the opposite side of the frame 100 as digging discs 400A and 400B. As digging disc 400C passes from the furrow 14C to above the irrigation trench 16, digging disc 400F moves downward underneath frame 100 and towards the right slope 13F of ridge 12F. As the Row Digger 100 continues to move in direction 25, digging disc 400F will excavate any dirt pile between furrow 14F and the irrigation trench 16. At all times three digger arms 300 are on one side of main frame 140 and three corresponding digger arms 300 are on the other side of main frame 140.

Turning to FIG. 21, the Row Digger 100 is shown advanced further in direction 25 as compared to FIG. 20 with the digger arms 300 also shown having rotated in direction 280 about the hub assembly 200.

In FIG. 21, digging disc 400A is shown in contact with the right slope 13A of ridge 12A. As the Row Digger 100 is advanced in direction 25, the slope 13A pushes against the convex surface 402 of the digging disc 400A causing the digging disc 400A to rotate the diggers arms 300 about the hub assembly 200. This rotation drives the movement of all digger arms 300 and corresponding digging discs 400. As the digger arms 300 rotate, disc 400A begins to move towards the furrow 14A such that the rear concave surface 404 will become parallel to the irrigation trench 16.

In FIG. 21, digging disc 400B is now shown beginning to excavate dirt pile 18B that is shown blocking the path of irrigation from irrigation trench 16 to furrow 14B. The arm spring 325 is shown energized and the digger arm 300 connected to digging disc 400B is shown bent about the hub arm fastener 320. The furrow 14C (although partially obscured by the wheel 176) is fully excavated with a clear passage 19C between the furrow 14C and the irrigation trench 16. The furrow 14D is also shown fully excavated with a clear passage 19D between the furrow 14D and the irrigation trench 16.

In FIG. 21, digging disc 400C is shown having completed its excavation of dirt pile 18C and is now on the opposite side of main frame 140 as digging disc 400B. Digging disc 400C is also shown moving upward as a result of hub angle 240.

In FIG. 21, digging disc 400D has moved to the location of digging disc 400E as shown in FIG. 20. Digging disc 400E and digging disc 400F are omitted from view.

Figure 22:
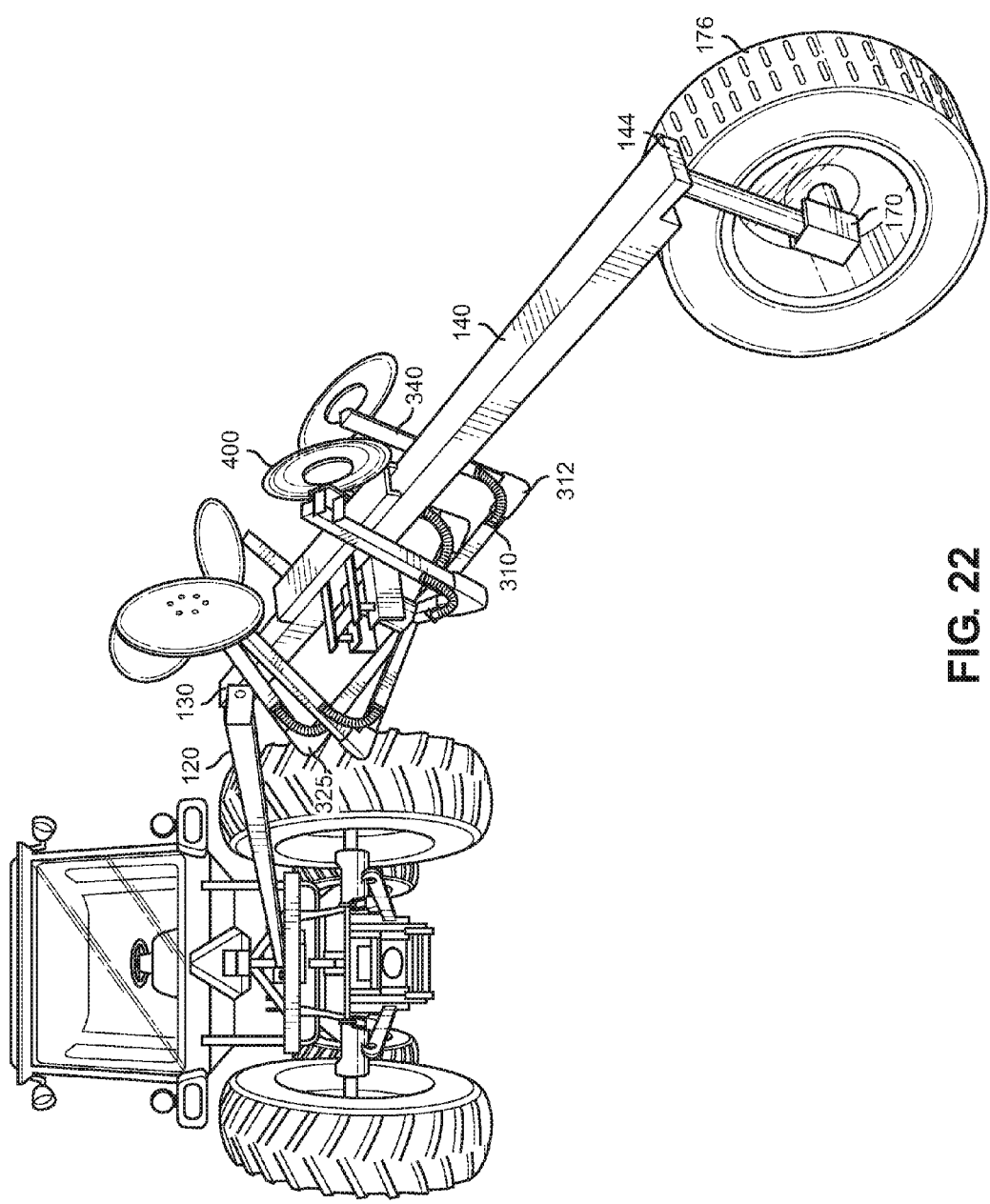
FIG. 22 is a rear isometric view of the Row Digger in a transportation position with the extender frame elevated with respect to and in line with the main frame and having the disc arms of the digging discs rotated in excess of 90 degrees in a direction opposite the ground.

Turning next to FIG. 22, the Row Digger 100 is shown in a transportation position. In transportation position, the main frame 140 is aligned with the extender frame member 120 through rotation at the elbow joint assembly 130. This rotation is accomplished by movement of the hydraulic arm 180 of the hydraulic mount 160. The hydraulic mount 160 can also act at mounting brackets 162 to raise the extender frame member 120 with respect to the main frame 140 to improve ground clearance for transportation over roads. Once so raised, the main frame 140 also pivots at elbow frame brackets 134 about pin 136 to further increase the ground clearance between the hub assembly 200 and the ground.

In the transportation position, the disc arms 340 of the digger arms 300 are rotated approximately 90 degrees with respect to the hub arms 310 and away from the ground. In this position, the arm springs 325 are fully energized and act on the disc arms 340 to prevent movement of the same. With the disc arms so positioned, the Row Digger 100 can be easily transported over roads.

While the Row Digger of the present invention as herein shown and disclosed in detail is fully capable of obtaining the objects and providing the advantages herein before stated, it is to be understood that it is merely illustrative of the preferred embodiments of the invention and that no limitations are intended to the details of construction or design herein shown other than as described in the appended claims.

I claim:

1. A Row Digger comprising:
   a main frame having a wheel connected to the main frame and a means for connecting the main frame to a vehicle opposite the wheel;
   a hub frame connected transversely to the main frame between the wheel and the means for connecting the main frame to a vehicle;
   a hub assembly connected to the hub frame at a position in the hub frame and at a hub angle with respect to the hub frame and having a hub housing and a hub flange with a plurality of hub tabs extending from the hub flange and wherein the hub flange can rotate with respect to the hub housing wherein the position of the hub assembly in the hub frame is adjustable and wherein the hub angle is also adjustable;
   a plurality of digger arms corresponding in number to the plurality of hub tabs and connected to and extending from the plurality of hub tabs; and
   a plurality of digging discs corresponding in number to and connected to the plurality of digger arms.

2. The Row Digger of claim 1 wherein the plurality of digger arms each has a hub arm and a disc arm rotatably connected to the hub arm.

3. The Row Digger of claim 2 wherein each of the hub arms has a hub arm spring bracket and each of the disc arms has a disc arm spring bracket and wherein an arm spring is connected between each hub arm spring bracket and each disc arm spring bracket.

4. The Row Digger of claim 2 wherein each of the plurality of digging discs is connected to the disc arm of the digger arm wherein each of the digging discs has a front convex surface and a rear concave surface and each having a flat central surface and a cutting perimeter surface.

5. The Row Digger of claim 4 wherein each of the plurality of digging discs is connected to the disc arm of the digger arm at a disc angle set to ensure that the digging disc approaches a furrow in a field with the appropriate orientation so as to ensure that the convex surface of one of the digging discs comes into contact with a slope of a ridge in a field when in use.

6. The Row Digger of claim 5 further comprising an extender frame connected to the main frame.

7. The Row Digger of claim 6 wherein the extender frame is connected to the main frame at a joint assembly such that the main frame can rotate with respect to the extender frame about the elbow joint assembly.

8. The Row Digger of claim 7 wherein the means for connecting the main frame to a vehicle is a hydraulic mount.

9. The Row Digger of claim 8 wherein the hydraulic mount is connected to the extender frame opposite the elbow joint assembly.

10. The Row Digger of claim 9 wherein the hydraulic mount is connected to the vehicle at mounting brackets.

11. The Row Digger of claim 1 wherein the hub angle is between 1 degree and 90 degrees.

12. The Row Digger of claim 5 wherein the disc angle is between 1 degree and 90 degrees.

13. The Row Digger of claim 5 wherein each of the disc arms has a disc arm receiver portion and a disc arm telescoping portion that enables the disc arm to be slidably adjustable by sliding the disc arm telescoping portion within the disc arm receiver portion.

14. The Row Digger of claim 5 wherein each digging disc further comprises a spindle bearing system such that each digging disc can rotate with respect to each of the disc arms.

15. A Row Digger comprising:
a main frame having a wheel connected to the main frame;
an extender frame pivotally connected to the main frame at an elbow joint assembly such that the main frame can both pivot and rotate with respect to the extender frame;
a hydraulic mount with a means for connecting the hydraulic mount to a vehicle and having a hydraulic arm connected to the extender frame opposite the elbow joint;
a hub frame connected transversely to the main frame between the wheel and the elbow joint assembly;
a hub assembly connected to the hub frame in a position in the hub frame and at a hub angle with respect to the hub frame and having a hub housing and a hub flange with a plurality of hub tabs extending from the hub flange and wherein the hub flange can rotate with respect to the hub housing and wherein the position of the hub assembly in the hub frame is adjustable and wherein the hub angle is adjustable;
a plurality of digger arms corresponding in number to the plurality of hub tabs and connected to and extending from the plurality of hub tabs wherein the plurality of digger arms each has a hub arm and a disc arm rotatably connected to the hub arm and wherein each of the hub arms has a hub arm spring bracket and each of the disc arms has a disc arm spring bracket and wherein an arm spring is connected between each hub arm spring bracket and each disc arm spring bracket; and
a plurality of digging discs having a front convex surface and a rear concave surface and each having a flat central surface and a cutting perimeter surface and corresponding in number to and connected to the plurality of digger arms at a disc angle, the disc angle set to ensure that the digging disc approaches a furrow in a field with the appropriate orientation so as to ensure that the convex surface of one of the digging discs comes into contact with a slope of a ridge in a field when in use.

16. The Row Digger of claim 15 wherein each of the digging discs is connected to one of the disc arms by a disc mounting bracket having at least one angled tab connecting the disc mounting bracket to the disc arm and thereby creating the disc angle.

17. The Row Digger of claim 16 wherein at least two mounting brackets are connected to the mount frame bottom and at least one mounting bracket is connected to the mount frame top.

18. The Row Digger of claim 15 wherein the hub frame further comprises a first transverse frame member and a second transverse frame member that each traverse the main frame and are mounted on the main frame at a distance sufficient to receive the hub assembly and wherein the first transverse frame member and the second transverse frame member each has a plurality of hub assembly through holes to enable the adjustment of the hub assembly within the hub frame.

19. The Row Digger of claim 15 wherein each of the disc arms has a disc arm receiver portion and a disc arm telescoping portion that enables the disc arm to be slidably adjustable by sliding the disc arm telescoping portion within the disc arm receiver portion.

20. A method of removing dirt piles between an irrigation trench and furrows in a field comprising the steps of:
a. Providing a Row Digger comprising
a main frame having a wheel connected to the main frame and a means for connecting the main frame to a vehicle opposite the wheel;
a hub frame connected to the main frame between the wheel and the means for connecting the main frame to a vehicle;
a hub assembly connected to the hub frame at a hub angle and having a hub housing and a hub flange with a plurality of hub tabs extending from the hub flange and wherein the hub flange can rotate with respect to the hub housing;
a plurality of digger arms corresponding in number to the plurality of hub tabs and connected to and extending from the plurality of hub tabs; and
a plurality of digging discs corresponding in number to and connected to the plurality of digger arms;
b. Connecting the Row Digger to a tow vehicle;
c. Placing the Row Digger and the tow vehicle in a field with an irrigation trench and ridges and furrows oriented substantially perpendicular to the irrigation trench wherein one or more dirt piles is located in one or more of the furrows near the irrigation trench; and
d. Using the tow vehicle to tow the Row Digger along the irrigation trench such that the wheel of the Row Digger travels in the irrigation trench.

* * * * *